United States Patent
Hicks et al.

(10) Patent No.: US 11,754,193 B2
(45) Date of Patent: Sep. 12, 2023

(54) TWO-WAY CHEMICAL INJECTION VALVE

(71) Applicant: Republic Oil Tools, LLC, Oklahoma City, OK (US)

(72) Inventors: Robert Hicks, Oklahoma City, OK (US); Joshua Prather, Acton, CA (US)

(73) Assignee: Republic Oil Tool, LLC, Oklahoma City, OK (US)

( * ) Notice: Subject to any disclaimer, the term of this patent is extended or adjusted under 35 U.S.C. 154(b) by 0 days.

(21) Appl. No.: 17/403,462

(22) Filed: Aug. 16, 2021

(65) Prior Publication Data
US 2022/0049779 A1 Feb. 17, 2022

Related U.S. Application Data

(60) Provisional application No. 63/065,643, filed on Aug. 14, 2020.

(51) Int. Cl.
*F16K 11/07* (2006.01)
*F16K 15/02* (2006.01)
*E21B 34/14* (2006.01)

(52) U.S. Cl.
CPC .......... *F16K 11/0716* (2013.01); *E21B 34/14* (2013.01); *F16K 15/028* (2013.01); *E21B 2200/06* (2020.05)

(58) Field of Classification Search
CPC ...... F16K 11/0716; F16K 3/265; F16K 3/262; E21B 34/14; E21B 3/10; E21B 3/12; E21B 2200/06; E21B 2200/02; Y10T 137/86702
USPC ........................................................ 137/883
See application file for complete search history.

(56) References Cited

U.S. PATENT DOCUMENTS

| | | | | |
|---|---|---|---|---|
| 2,999,546 | A * | 9/1961 | Grimmer | E21B 34/14 137/155 |
| 4,406,335 | A * | 9/1983 | Koot | E21B 21/103 175/243 |
| 4,407,362 | A * | 10/1983 | Bechthold | E21B 43/123 166/117.5 |
| 6,289,921 | B1 * | 9/2001 | Neuhaus | F16K 27/041 137/625.68 |
| 2009/0095365 | A1 * | 4/2009 | Sonerud | E02F 9/2267 137/883 |
| 2011/0083857 | A1 * | 4/2011 | Knobloch, Jr. | E21B 34/12 166/321 |
| 2013/0213646 | A1 * | 8/2013 | Angman | E21B 34/14 166/184 |
| 2015/0083133 | A1 * | 3/2015 | Dunn | A62B 18/084 137/625.68 |
| 2016/0146554 | A1 * | 5/2016 | Bhatia | F16K 11/0716 137/625.48 |
| 2017/0211347 | A1 * | 7/2017 | Vasques | E21B 33/127 |
| 2018/0252072 | A1 * | 9/2018 | Loh | E21B 34/14 |

(Continued)

*Primary Examiner* — Jessica Cahill
(74) *Attorney, Agent, or Firm* — Hall Estill Law Firm; Bryan A. Fuller

(57) ABSTRACT

A two-way injection valve having a primary flow path to allow chemical injection into an annulus area surrounding production tubing and a secondary flow path to allow chemical injection into the inside of the production tubing via a tubular member of the production tubing. A method of using the two-way injection valve includes the step of injecting chemical into an annulus area via a two-way injection valve. The method also includes the step of injecting chemical inside of production tubing via the two-way injection valve.

20 Claims, 10 Drawing Sheets

(56) References Cited

U.S. PATENT DOCUMENTS

| | | | |
|---|---|---|---|
| 2019/0003283 A1* | 1/2019 | Atkins | E21B 34/14 |
| 2020/0115997 A1* | 4/2020 | Stang | E21B 1/00 |
| 2021/0115767 A1* | 4/2021 | Tajallipour | E21B 47/18 |

* cited by examiner

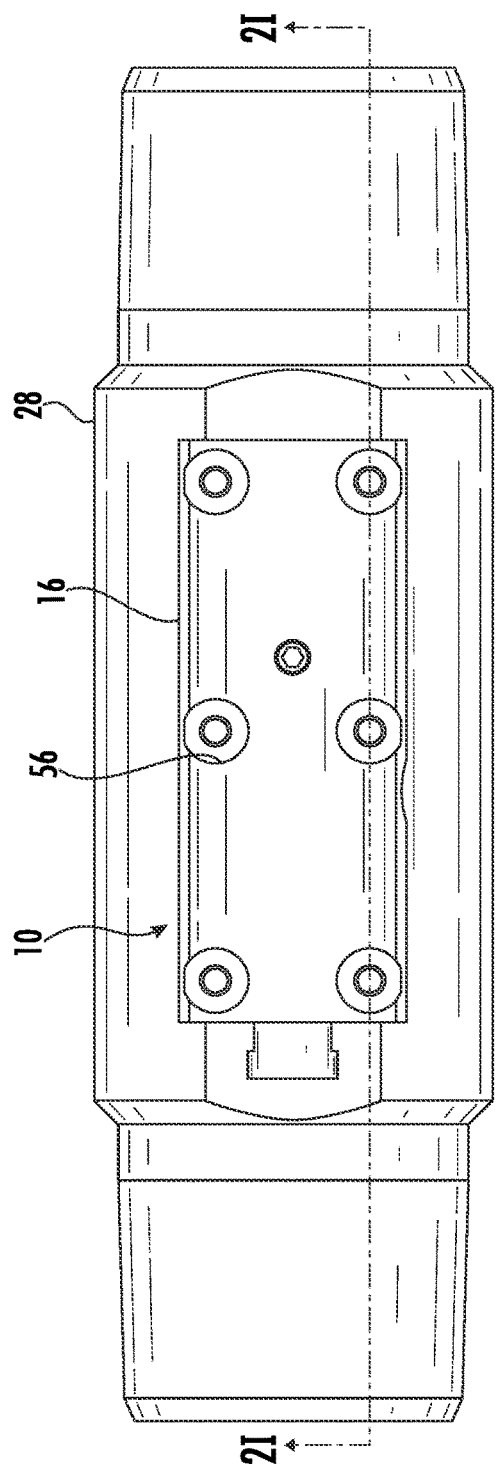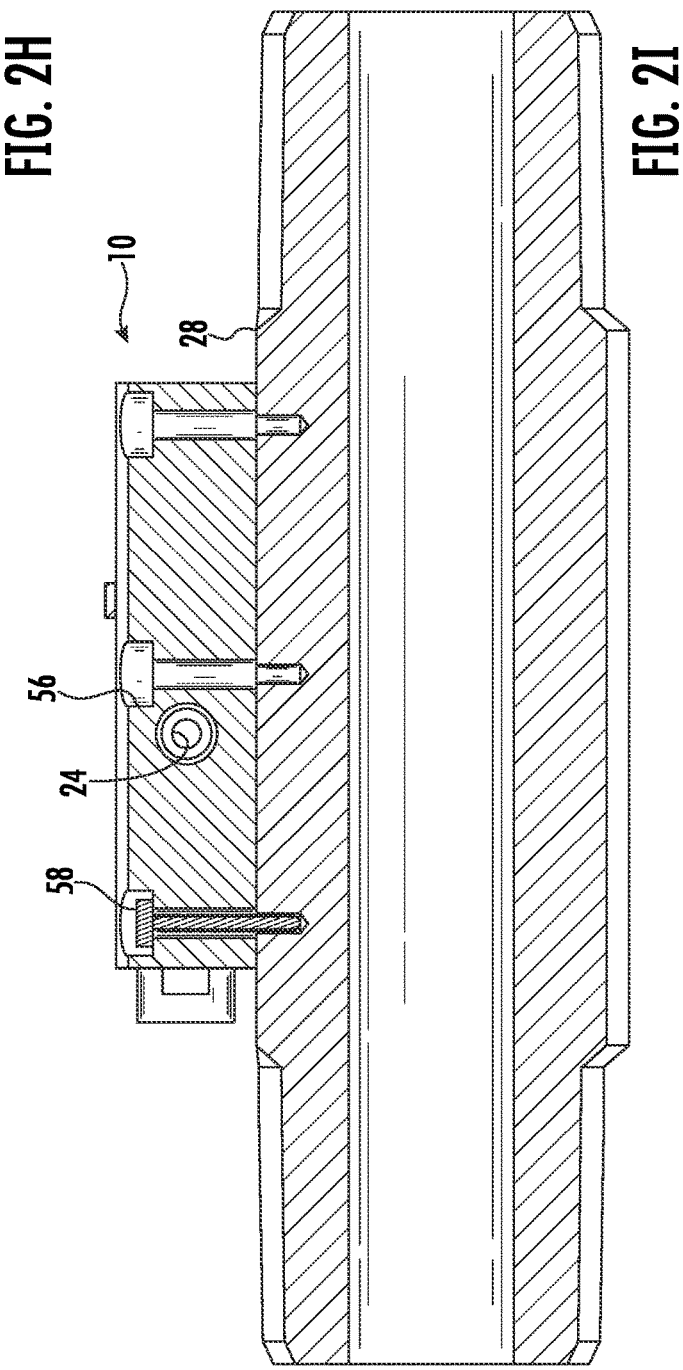

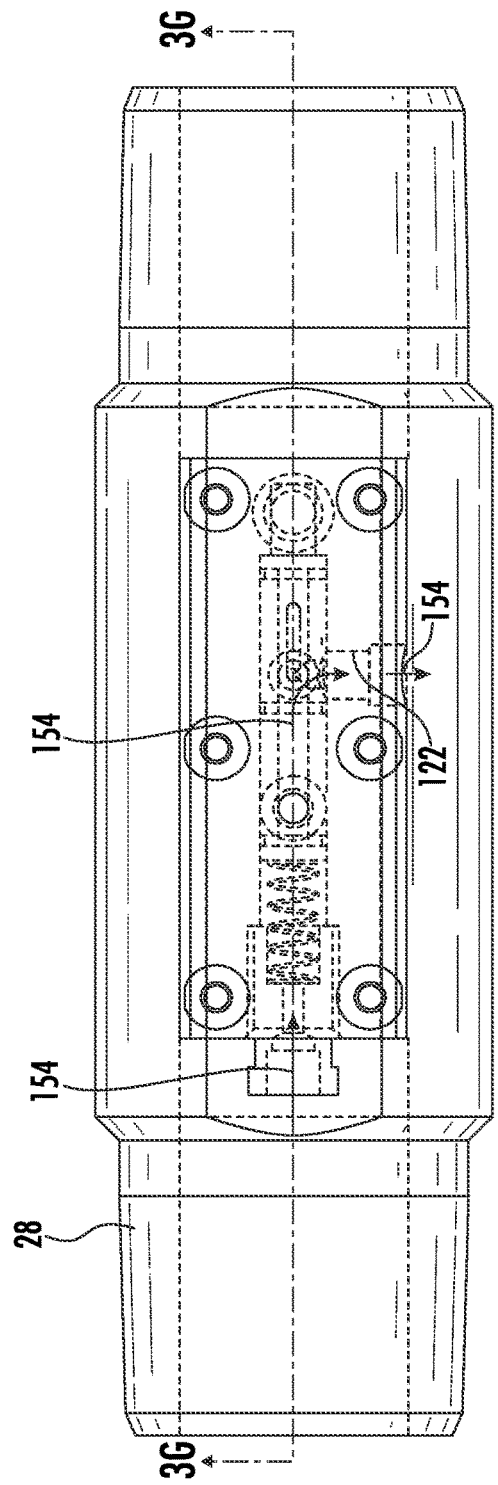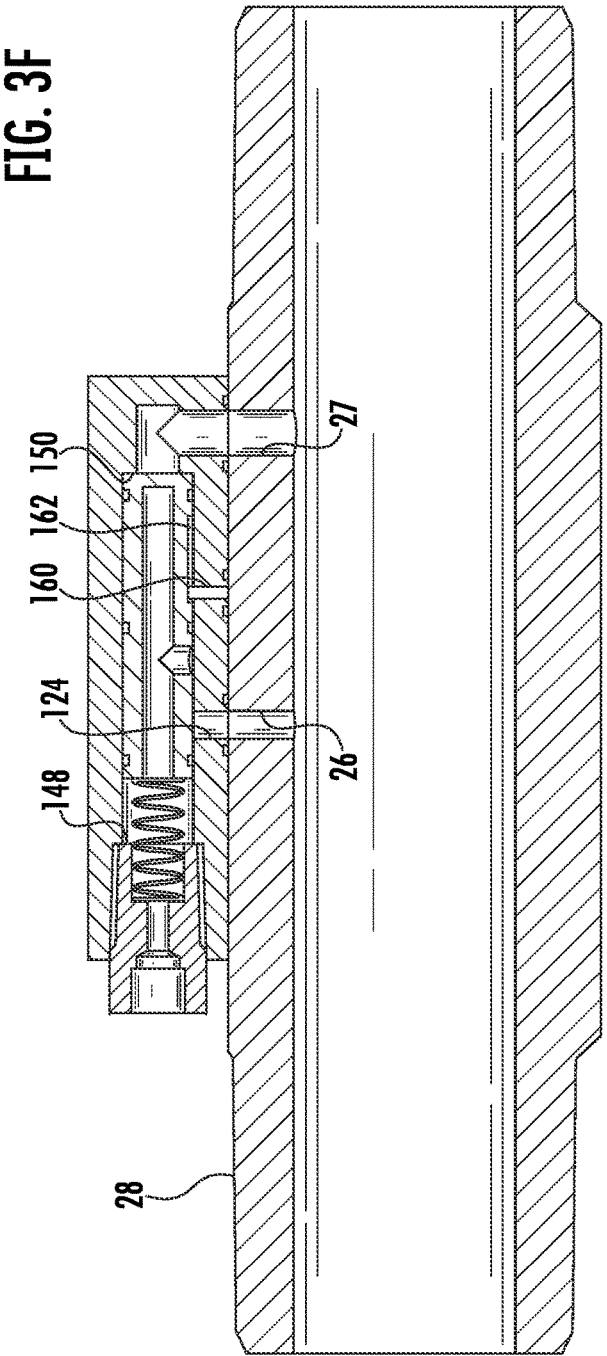

TWO-WAY CHEMICAL INJECTION VALVE

STATEMENT REGARDING FEDERALLY SPONSORED RESEARCH OR DEVELOPMENT

Not applicable.

CROSS-REFERENCE TO RELATED APPLICATIONS

The present application is a conversion of U.S. Provisional application having U.S. Ser. No. 63/065,643, filed Aug. 24, 2020, which claims the benefit under 35 U.S.C. 119(e). The disclosures of which are hereby expressly incorporated herein by reference.

BACKGROUND OF THE DISCLOSURE

1. Field of the Invention

The present disclosure relates to a two-way injection valve for enabling injection of chemicals into production tubing or into an annulus area surrounding the production tubing.

2. Description of the Related Art

Conventional chemical injection check valves are typically run on a capillary string and strapped to the outside of a production tubular whereby it enables chemical injection in the annulus while preventing wellbore fluids from migrating up the capillary string. This is beneficial during normal operations of the production of oil and gas when the well is producing continuously with or without the use of artificial lift to assist in getting the wellbore fluids to surface. However, there are circumstances in the life cycle of the wellbore where production must be shut in. In these circumstances, another type of chemical injection check valve can be used to inject chemicals into the production tubing. During this shut down period, having the ability to inject chemical inside the production tubing instead of the annulus gives operators the opportunity to protect the internals of their downhole equipment instead of just the outside of the equipment that is exposed to the annulus.

Chemical injection is now widely utilized in upstream oil and gas operations and serves as an insurance policy to protect the production bottom hole assembly and the reservoir. Chemicals typically injected include scale inhibitor, corrosion inhibitor, paraffin blockers, surfactants, hydrogen sulfide scavengers, biocides, friction reducers, etc. Historically, chemicals have been injected downhole via a capillary string with a check valve on the bottom of it that prevents wellbore fluids from coming back to the surface via the capillary string. Operators have been forced to select whether they want to inject chemical in the annulus or the production tubing and once the system is run in hole. The current technology prevents this from being changed without conducting a workover to pull the entire tubing string out of the hole.

Accordingly, there is a need for a single injection valve that can inject chemicals directly into the production tubing and/or into the annulus area surrounding the production tubing without the need for a workover to pull the entire tubing string out of the hole.

SUMMARY OF THE DISCLOSURE

The present disclosure is directed to a two-way injection valve. The two-way injection valve having a primary flow path to allow chemical injection into an annulus area surrounding production tubing and a secondary flow path to allow chemical injection into the inside of the production tubing via a tubular member of the production tubing.

The present disclosure is also directed to a method of using the two-way injection valve. The method includes the step of injecting chemical into an annulus area via a two-way injection valve. The method also includes the step of injecting chemical inside of production tubing via the two-way injection valve.

BRIEF DESCRIPTION OF THE DRAWINGS

FIGS. 2A-2I show various views of a two-way injection valve constructed in accordance with the present disclosure.

FIG. 3A-3G show various views of another embodiment of a two-way injection valve constructed in accordance with the present disclosure.

DETAILED DESCRIPTION OF THE DISCLOSURE

Figure 1:
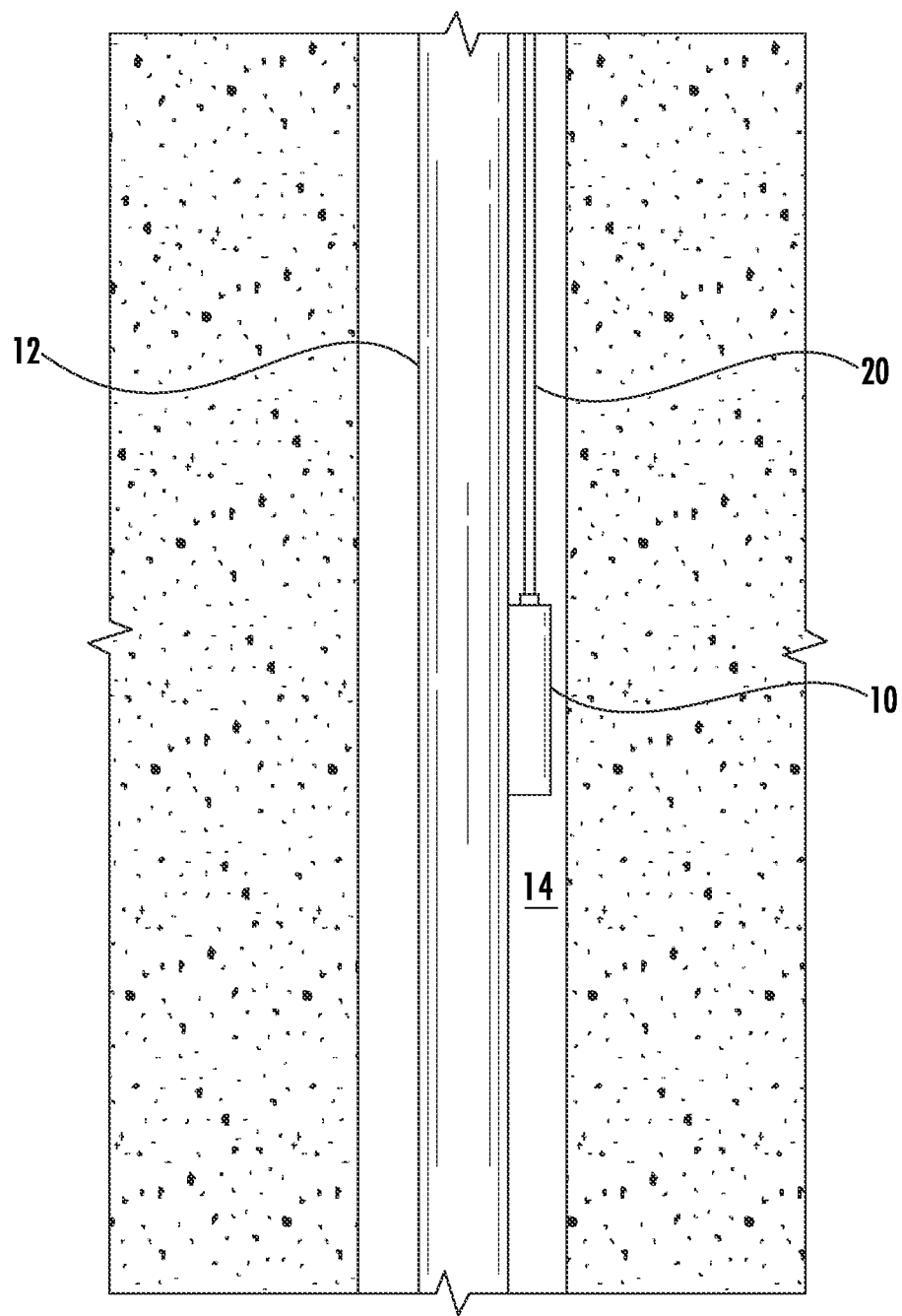
FIG. 1 is a side elevation view of a two-way injection valve constructed in accordance with the present disclosure.
Figure 2A:
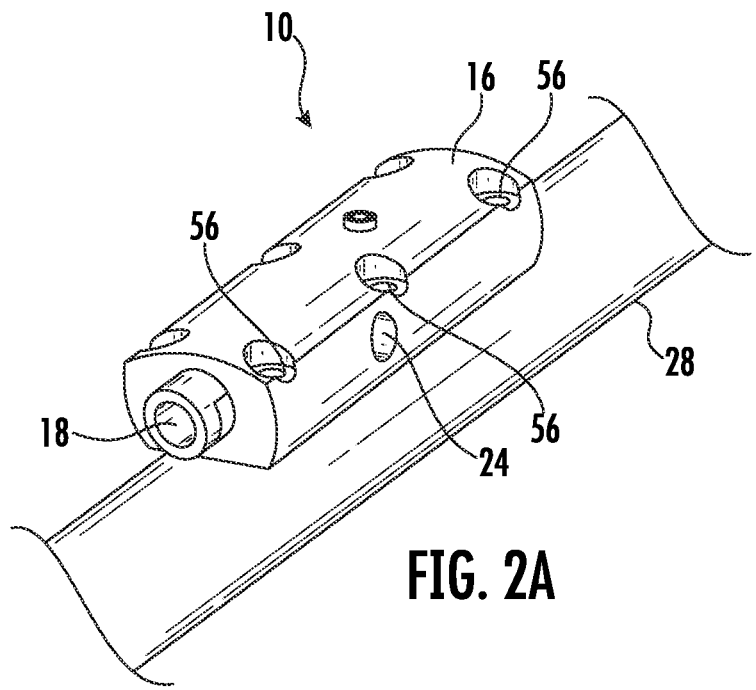
Figure 2B:
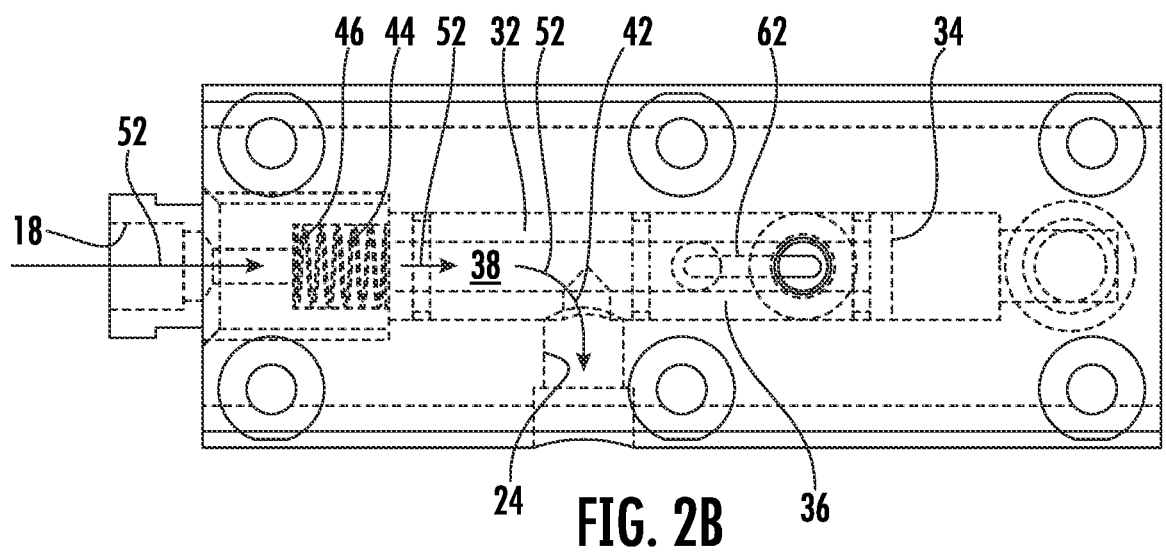
Figure 2C:
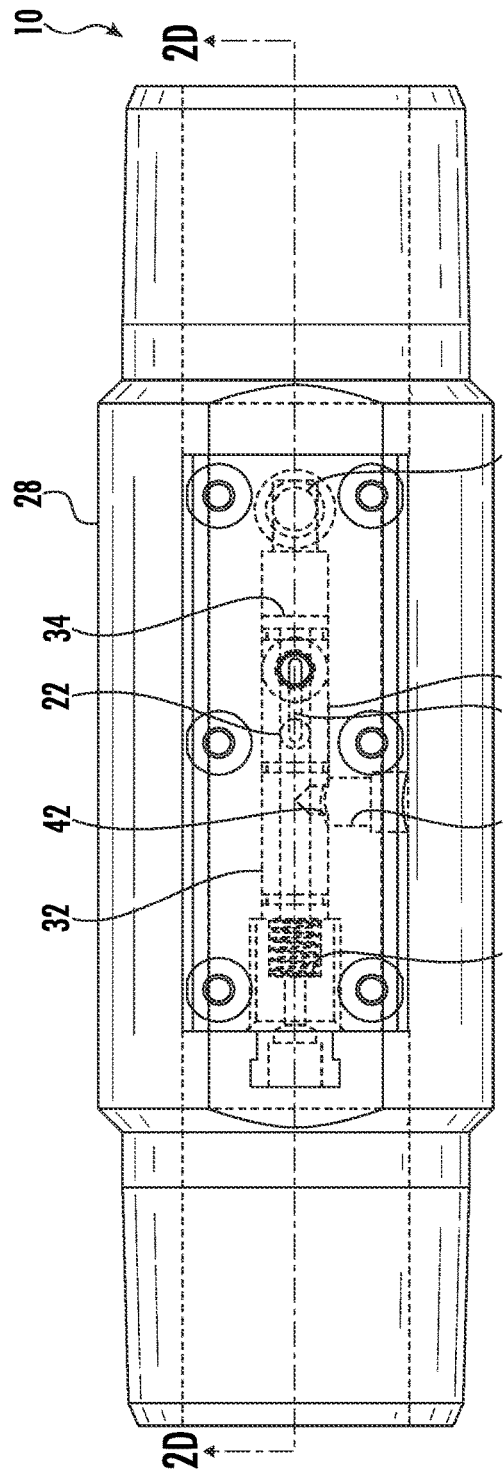
Figure 2D:
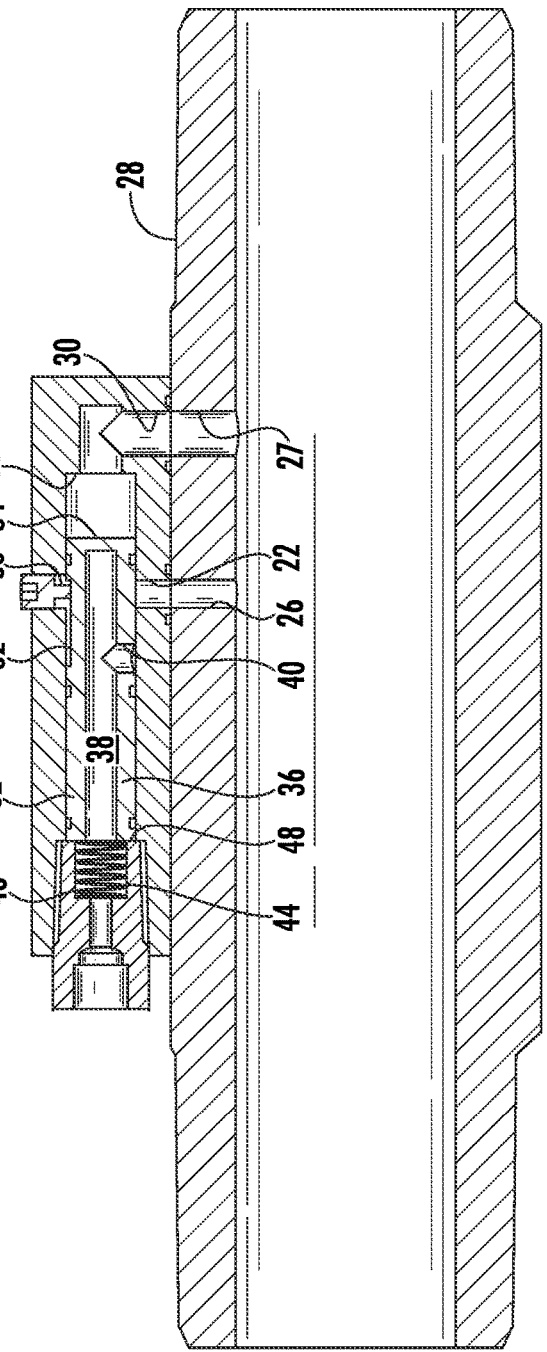
Figure 2E:
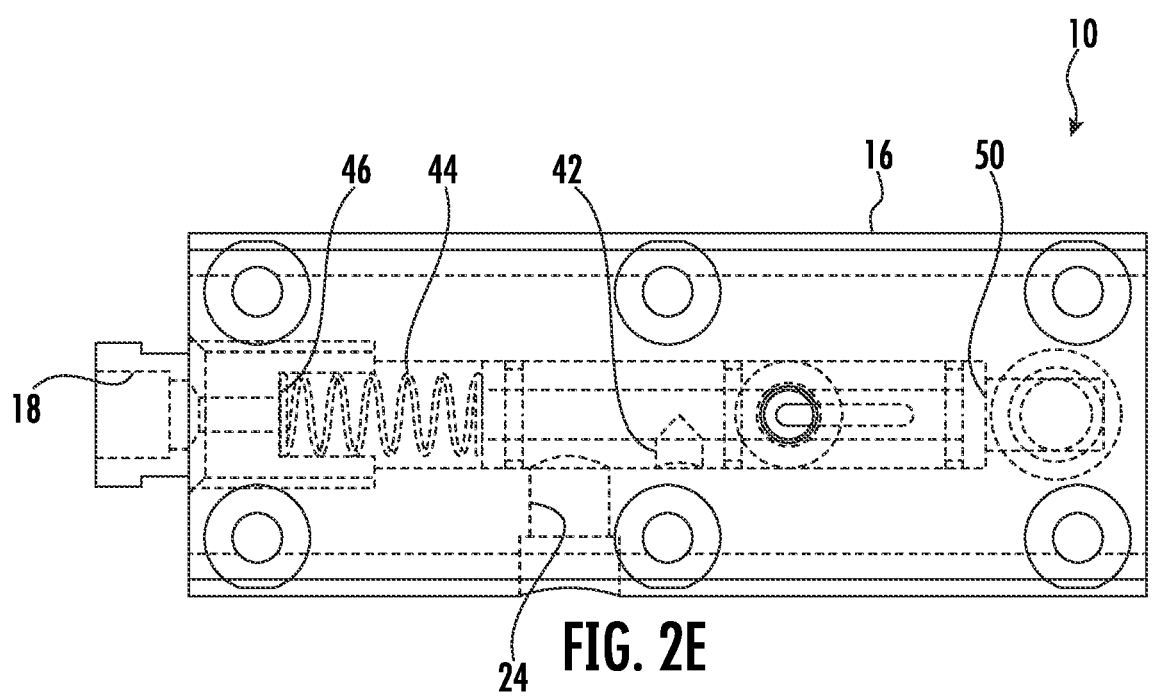
Figure 2F:
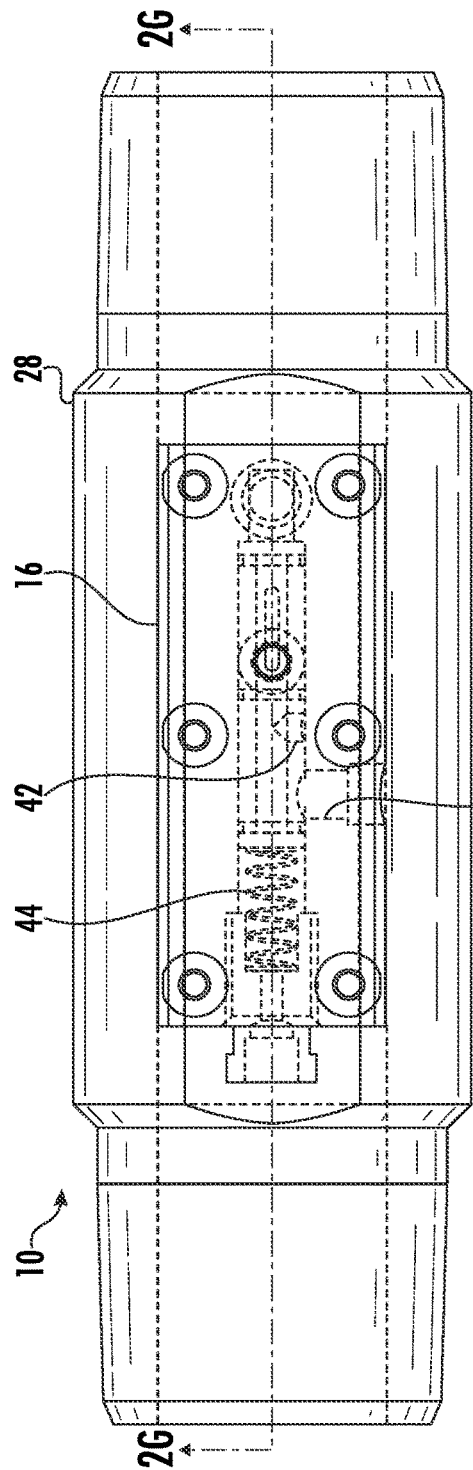
Figure 2G:
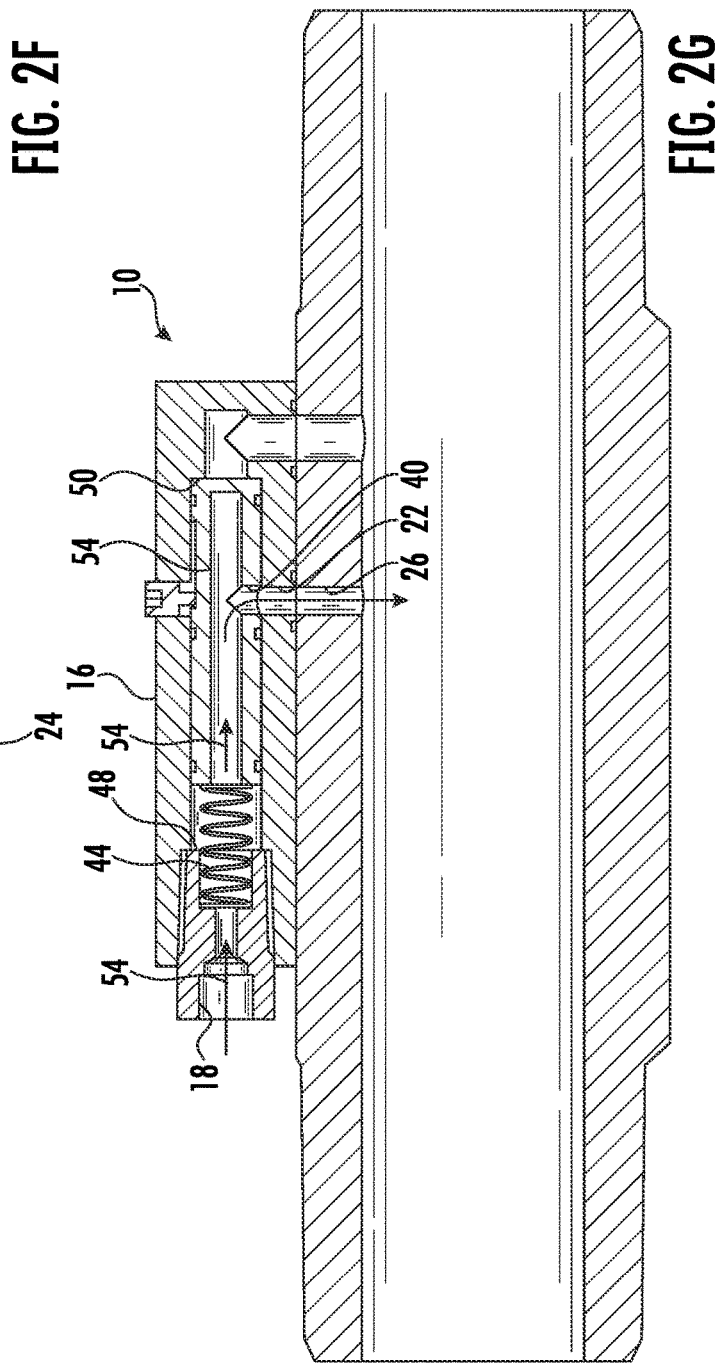
Figure 3A:
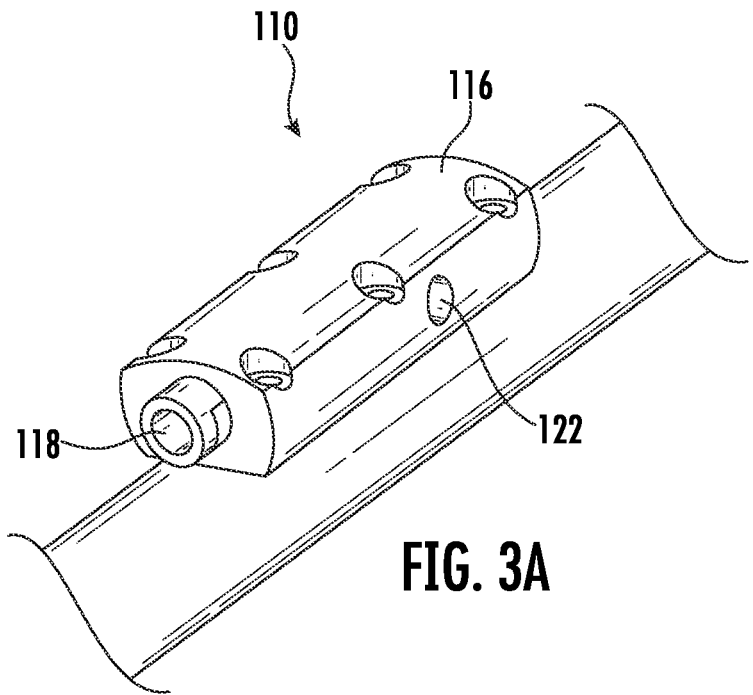
Figure 3B:
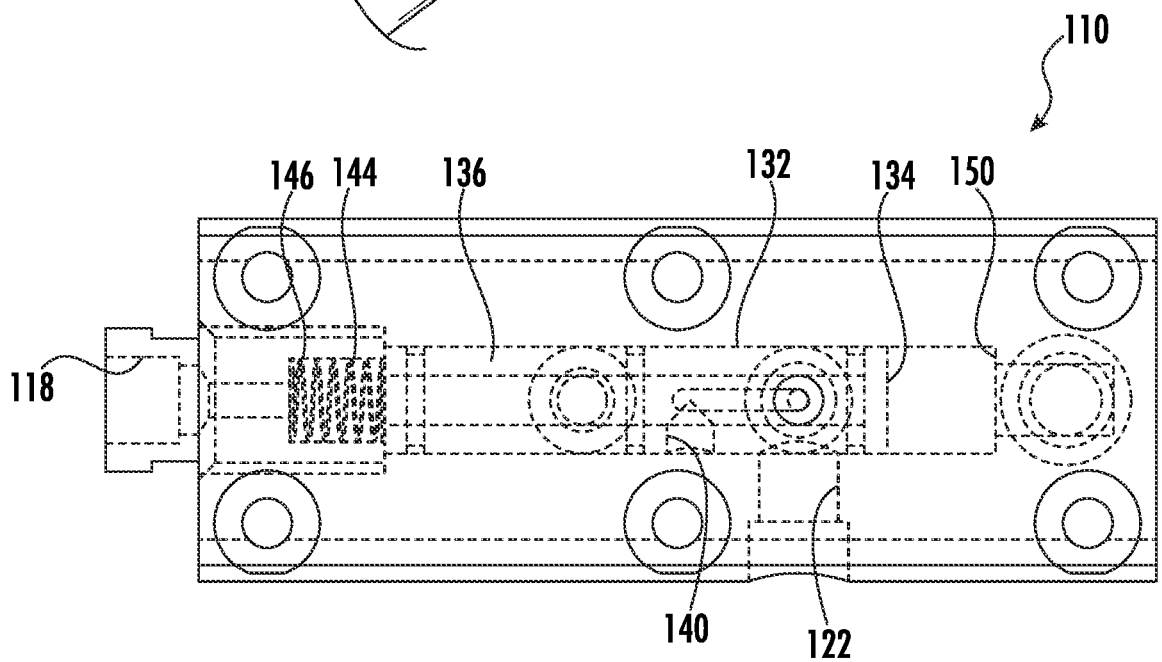
Figure 3C:
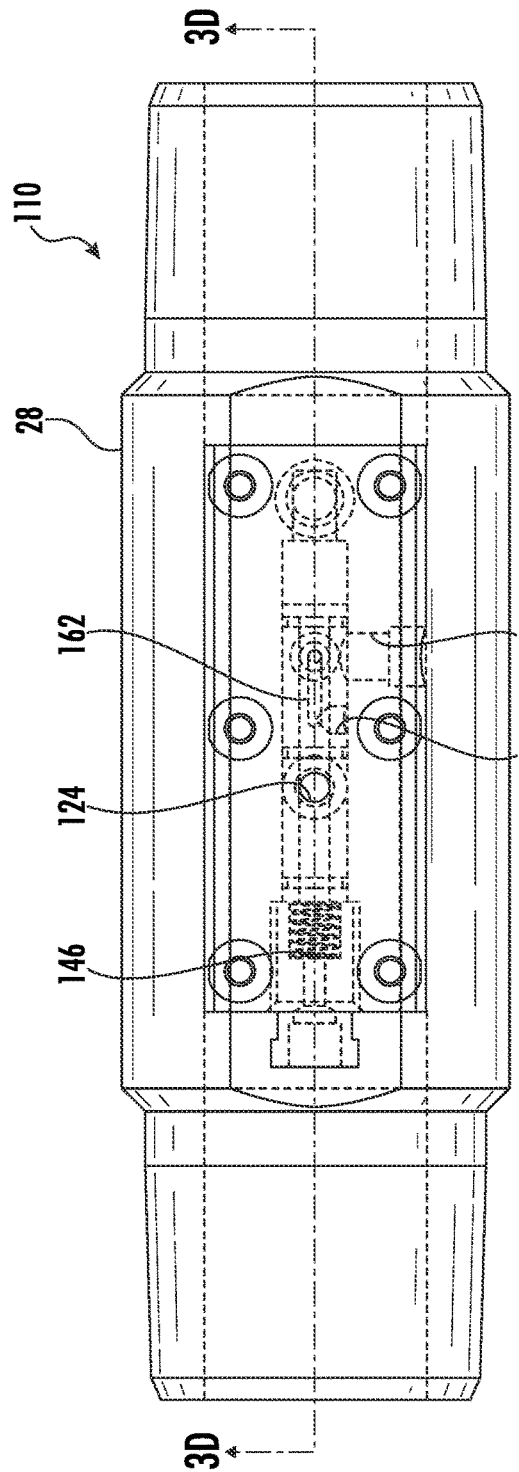
Figure 3D:
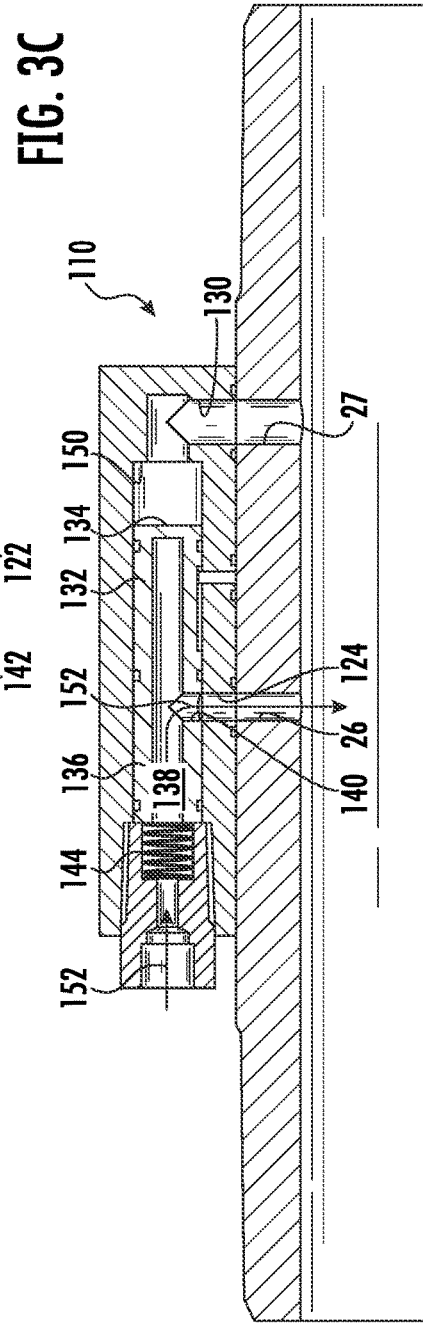
Figure 3E:
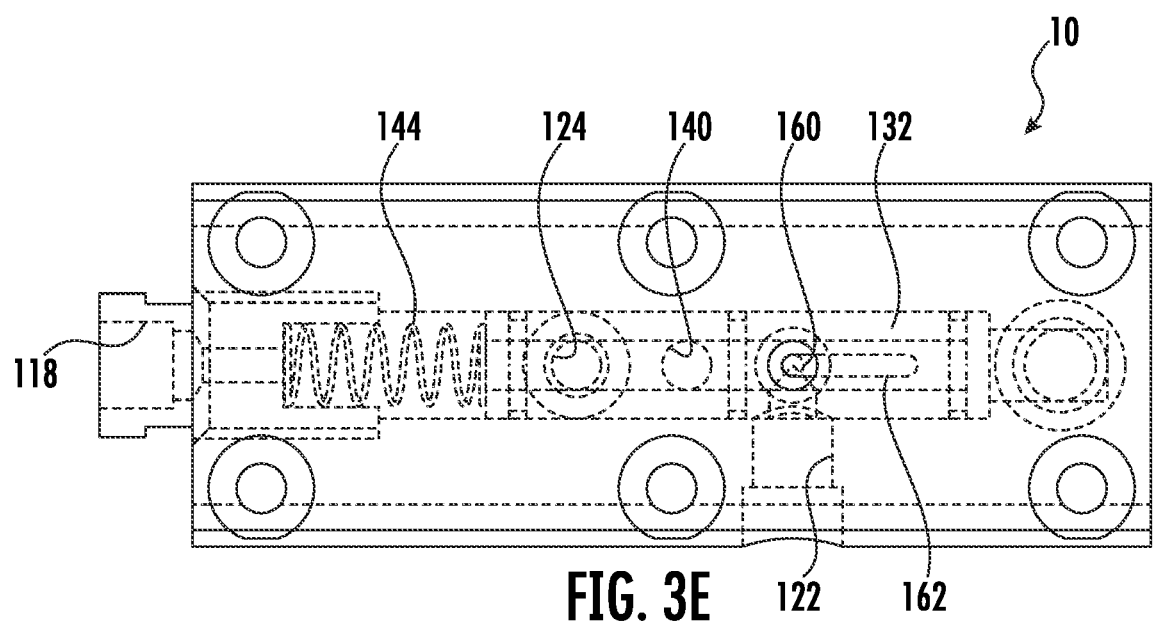

Referring now to FIG. 1, the present disclosure relates to a two-way injection valve 10 that enables chemical injection into production tubing 12 or an annulus area 14 surrounding the production tubing 12. In one embodiment of the present disclosure shown in FIGS. 2A-2I, the two-way injection valve 10 includes a body 16 and a first opening 18 in the body 16 in fluid communication with a capillary string 20. In one embodiment, the two-way injection valve 10 also includes a second opening 22 in the body 16 and a third opening 24 in the body 16. The second opening 22 is in fluid communication with the inside of the production tubing 12 via a tubular opening 26 disposed in a tubular member 28 of the production tubing 12 the two-way injection valve 10 is attached to and selectively in fluid communication with the capillary string 20. The third opening 24 in the body 16 in fluid communication with the annulus area 14 surrounding the production tubing 12. The two-way injection valve 10 includes a fourth opening 30 disposed in the body 16 in fluid communication with the inside of the production tubing 12 via a second tubular opening 27 disposed in the tubular member 28 of the production tubing 12 the two-way injection valve 10 is attached to. The fourth opening 30 is not in fluid communication with the capillary string 20.

The two-way injection valve 10 further includes a piston 32 slidably disposed within the body 16 of the two-way injection valve 10. The piston 32 has a piston head 34 with a sleeve member 36 extending from the piston head 34. The sleeve member 36 and the piston head 34 creates a cavity 38 in the piston 32. The sleeve member 36 of the piston 32 has a tubing opening 40 disposed therein that is in fluid communication with the first opening 18 in the body 16 and the capillary string 20. The tubing opening 40 is selectively in fluid communication with the second opening 22 in the body 16, the tubular opening 26 in the tubular member 28 and the inside of the production tubing 12. The sleeve member 36 of the piston 32 also includes an annulus opening 42 that is in fluid communication with the first opening 18 in the body 16 and the capillary string 20. The annulus opening 42 is selectively in fluid communication with the third opening 24 in the body 16 of the two-way injection valve 10 and the annulus area 14 surrounding the production tubing 12.

The two-way injection valve 10 can also include a spring 44 disposed therein to facilitate movement of the piston 32 in the two-way injection valve 10. The spring 44 is positioned between a first shoulder portion 46 disposed on the inside of the body 16 and the end of the sleeve member 36 of the piston 32 disposed opposite of the piston head 34. The inside of the body 16 of the two-way injection valve 10 includes a second shoulder 48 and a third shoulder 50. The second shoulder 48 limits the amount of travel the piston 32 has within the body 16 in the direction towards the spring 44. Conversely, the third shoulder 50 limits the amount of travel the piston 32 has in the direction away from the spring 44 within the body 16 of the two-way injection valve 10.

The two-way injection valve 10 can have a primary flow path shown by arrows 52 associated with a first position of the piston 32 in the body 16 of the two-way injection valve 10 and a secondary flow path shown by arrows 54 associated with a second position of the piston 32 in the body 16 of the two-way injection valve 10. The primary flow path is open when the capillary string 20 is in fluid communication with the annulus area 14 and the secondary flow path is open when the capillary string 20 is in fluid communication with the inside of the production tubing 12. When a downhole pumping system is used, the pressure of the fluid in the production tubing 12 is applied to the piston 32 via the fourth opening 30 in the body 16 of the two-way injection valve 10 and the second tubular opening 27 in the tubular member 28. The pressure of the fluid in the production tubing 12 is greater than the force applied to the piston 32 from the spring 44. This force differential causes the spring 44 to collapse and forces the piston 32 in the direction of the spring 44. The piston 32 can only be forced so far in this direction due to the second shoulder 48 in the body 16 of the two-way injection valve 10 limiting the movement of the piston 32 in this direction. When the piston 32 is forced against the second shoulder 48, the annulus opening 42 in the sleeve member 36 of the piston 32 is aligned with the third opening 24 in the body 16 (i.e. the primary flow path is open). When the primary flow path is open, desired chemicals can be injected into the annulus area 14 via the capillary string 20 and the two-way injection valve 10. The two-way injection valve 10 can also include a spline 60 extending into the body 16 to engage a depressed slot 62 disposed in an outer part of the piston 32 to prevent rotation of the piston 32 inside the body 16 of the two-way injection valve 10.

Conversely, when desired, the pressure of the fluid in the production tubing 12 can be lowered to a pressure that is less than the force applied to the piston 32 by the spring 44. This force differential causes the spring 44 to expand and forces the piston 32 in the direction away from the spring 44. The piston 32 can only be forced so far in this direction due to the third shoulder 50 in the body 16 of the two-way injection valve 10 limiting the movement of the piston 32 in this direction. When the piston 32 is forced against the third shoulder 50, the tubing opening 40 in the sleeve member 36 of the piston 32 is aligned with the second opening 22 in the body 16 (i.e., the secondary flow path is open). When the secondary flow path is open, desired chemicals can be injected into the production tubing 12 via the capillary string 20 and the two-way injection valve 10.

In an alternative embodiment of the present disclosure shown in FIGS. 3A-3G, an alternative two-way injection valve 110 is described. The two-way injection valve 110 of this embodiment includes a body 116 and a first opening 118 in the body 116 in fluid communication with a capillary string 20. In one embodiment, the two-way injection valve 110 also includes a second opening in the body 116 and a third opening 124 in the body 116. The second opening 122 is in fluid communication with the annulus area 14 surrounding the production tubing 12. The third opening 124 in the body 116 is in fluid communication with the inside of the production tubing 12 via the tubular opening 26 disposed in the tubular member 28 of the production tubing 12 the two-way injection valve 110 is attached to and selectively in fluid communication with the capillary string 20. The two-way injection valve 110 includes a fourth opening 130 disposed in the body 116 in fluid communication with the inside of the production tubing 12 via the second tubular opening 27 disposed in the tubular member 28 of the production tubing 12 the two-way injection valve 110 is attached to. The fourth opening 130 is not in fluid communication with the capillary string 20.

The two-way injection valve 110 further includes a piston 132 slidably disposed within the body 116 of the two-way injection valve 110. The piston 132 has a piston head 134 with a sleeve member 136 extending from the piston head 134. The sleeve member 136 and the piston head 134 creates a cavity 138 in the piston 132. The sleeve member 136 of the piston 132 has a tubing opening 140 disposed therein that is in fluid communication with the first opening 118 in the body 116 and the capillary string 20. The tubing opening 140 is selectively in fluid communication with the third opening 124 in the body 116, the tubular opening 26 in the tubular member 28 and the inside of the production tubing 12. The sleeve member 136 of the piston 132 also includes an annulus opening 142 that is in fluid communication with the first opening 118 and the capillary string 20. The annulus opening 142 is selectively in fluid communication with the second opening 122 in the body 116 of the two-way injection valve 110 and the annulus area 14 surrounding the production tubing 12.

The two-way injection valve 110 can also include a spring 144 disposed therein to facilitate movement of the piston 132 in the two-way injection valve 110. The spring 144 is positioned between a first shoulder portion 146 disposed on the inside of the body 116 and the end of the sleeve member 136 of the piston 132 disposed opposite of the piston head 134. The inside of the body 116 of the two-way injection valve 110 includes a second shoulder 148 and a third shoulder 150. The second shoulder 148 limits the amount of travel the piston 132 has within the body 116 in the direction towards the spring 144. Conversely, the third shoulder 150 limits the amount of travel the piston 132 has in the direction away from the spring 144 within the body 116 of the two-way injection valve 110.

The two-way injection valve 110 can have a primary flow path (shown by arrows 152) associated with a first position of the piston 132 in the body 116 of the two-way injection valve 110 and a secondary flow path (shown by arrows 154) associated with a second position of the piston 132 in the body 116 of the two-way injection valve 110. The primary flow path is open when the capillary string 20 is in fluid communication with the inside of the production tubing 12 and the secondary flow path is open when the capillary string 20 is in fluid communication with the annulus area 14. When a downhole pumping system is used, the pressure of the fluid in the production tubing 12 is applied to the piston 132 via the fourth opening 130 in the body 116 of the two-way injection valve 110 and the second tubular opening 27 in the tubular member 28. The pressure of the fluid in the production tubing 12 is greater than the force applied to the piston 132 from the spring 144. This force differential causes the spring 144 to collapse and forces the piston 132 in the direction of the spring 144. The piston 132 can only be forced so far in this direction due to the second shoulder 148 in the body 116 of the two-way injection valve 110 limiting the movement of the piston 132 in this direction. When the piston 132 is forced against the second shoulder 148, the tubing opening 140 in the sleeve member 136 of the piston 132 is aligned with the second opening 122 in the body 116 (i.e. the primary flow path is open). When the primary flow path is open, desired chemicals can be injected into the inside of the production tubing 12 via the capillary string 20 and the two-way injection valve 110. The two-way injection valve 110 can also include a spline 160 extending into the body 116 to engage a depressed slot 162 disposed in an outer part of the piston 132 to prevent rotation of the piston 132 inside the body 116 of the two-way injection valve 110.

Conversely, when desired, the pressure of the fluid in the production tubing 12 can be lowered to a pressure that is less than the force applied to the piston 132 by the spring 144. This force differential causes the spring 144 to expand and forces the piston 132 in the direction away from the spring 144. The piston 132 can only be forced so far in this direction due to the third shoulder 150 in the body 116 of the two-way injection valve 110 limiting the movement of the piston 132 in this direction. When the piston 132 is forced against the third shoulder 150, the annulus opening 142 in the sleeve member 136 of the piston 132 is aligned with the third opening 124 in the body 116 (i.e. the secondary flow path is open). When the secondary flow path is open, desired chemicals can be injected into the annulus area 14 via the capillary string 20 and the two-way injection valve 110.

The present disclosure is also directed toward a method of selectively injecting chemicals into the annulus area 14 surrounding the production tubing 12 or injecting chemicals inside the production tubing 12. The two-way injection valve 10 or 110 can be secured to the tubular member 28 of the production tubing 12 and deployed into the oil and gas well. Chemicals can be injected into the tubing string or the annulus area 14 via the capillary string 20 and the two-way injection valve 10 or 110. The piston 32 or 132 in the two-way injection valve 10 or 110 can be shifted while the two-way injection valve 10 or 110 remains in the wellbore and chemicals can then be injected into the annulus area 14 or inside the production tubing 12, whichever was not injected prior to shifting the piston 32 or 132 in the two-way injection valve 10 or 110.

The body 16 or 116 of the two-way injection valve 10 or 110 can be coupled to the tubular member 28 in any manner known in the art. In one embodiment, the body 16 or 116 has securing holes 56 disposed therein to permit screws 58 to extend therethrough and engage the tubular member 28 and secure the two-way injection valve 10 or 110 to the desired tubular member 28.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A two-way injection valve, the two-way injection valve comprising:
    a body that is attachable to an outside part of production tubing in a radial direction;
    a primary flow path to allow chemical injection into an annulus area surrounding the production tubing; and
    a secondary flow path to allow chemical injection into the inside of the production tubing via a tubular member of the production tubing.

2. The two-way injection valve of claim 1 further comprising:
    a first opening in the body to receive chemical injection material;
    a second opening in the body that directs the chemical injection material from inside the body to the annulus area; and
    a third opening in the body that directs the chemical injection material from inside the body to inside the production tubing.

3. The two-way injection valve of claim 2 further comprising:
    a piston slidably disposed within the body of the two-way injection valve, the piston including a piston head with a sleeve member extending from the piston head to create a cavity in the piston.

4. The two-way injection valve of claim 3 wherein the piston has a tubing opening that is in fluid communication with a tubular opening in the tubular member when the piston is in a first position in the body of the two-way injection valve and an annulus opening that is in fluid communication with the second opening when the piston is in a second position in the body of the two-way injection valve.

5. The two-way injection valve of claim 3 wherein the piston has an annulus opening that is in fluid communication with the second opening when the piston is in a first position in the body of the two-way injection valve and a tubing opening that is in fluid communication with a tubular opening in the tubular member when the piston is in a second position in the body of the two-way injection valve.

6. The two-way injection valve of claim 3 wherein the two-way injection valve further comprises a spring disposed between the piston and a shoulder disposed in the body of the two-way injection valve.

7. The two-way injection valve of claim 3 wherein the two- way injection valve further comprises securing holes disposed therein to allow the two-way injection valve to be secured to the tubular member with screws.

8. The two-way injection valve of claim 3 wherein the primary flow path passes through the first and second openings in the body of the two-way injection valve and the annulus opening in the piston and the secondary flow path passes through the first and third openings in the body and the tubing opening of the piston.

9. A method, the method comprising:
    injecting chemical into an annulus area via a two-way injection valve, the two-way injection valve attached to an outside part of production tubing in a radial direction; and
    injecting chemical inside of the production tubing via the two-way injection valve.

10. The method of claim 9 wherein two-way injection valve is mounted on an outside portion of a tubular member of the production tubing.

11. The method of claim 9 wherein the chemical is injected into the annulus area prior to being injected inside the production tubing.

12. The method of claim 9 wherein the chemical is injected inside the production tubing prior to being injection into the annulus area.

13. The method of claim 9 wherein the two-way injection valve can switch back and forth from injecting the chemical into the annulus area and inside the production tubing a desired number of times.

14. The method of claim 9 wherein the two-way injection valve comprises:
a primary flow path to allow chemical injection into the annulus area surrounding production tubing; and
a secondary flow path to allow chemical injection into the inside of the production tubing via a tubular member of the production tubing.

15. The method of claim 14 further comprising:
a body;
a first opening in the body to receive chemical injection material;
a second opening in the body that directs the chemical injection material from inside the body to the annulus area; and
a third opening in the body that directs the chemical injection material from inside the body to inside the production tubing.

16. The method of claim 15 further comprising:
a piston slidably disposed within the body of the two-way injection valve, the piston including a piston head with a sleeve member extending from the piston head to create a cavity in the piston.

17. The method of claim 16 wherein the piston has a tubing opening that is in fluid communication with a tubular opening in the tubular member when the piston is in a first position in the body of the two-way injection valve and an annulus opening that is in fluid communication with the second opening when the piston is in a second position in the body of the two-way injection valve.

18. The method of claim 16 wherein the piston has an annulus opening that is in fluid communication with the second opening when the piston is in a first position in the body of the two-way injection valve and a tubing opening that is in fluid communication with a tubular opening in the tubular member when the piston is in a second position in the body of the two-way injection valve.

19. The method of claim 16 wherein the two-way injection valve further comprises a spring disposed between the piston and a shoulder disposed in the body of the two-way injection valve.

20. The method of claim 16 wherein the primary flow path passes through the first and second openings in the body of the two-way injection valve and the annulus opening in the piston and the secondary flow path passes through the first and third openings in the body and the tubing opening of the piston.

* * * * *